Feb. 2, 1954    R. G. MARZOLF    2,668,086
LUBRICANT CONTAINER FOR BEARINGS
Filed Oct. 19, 1951
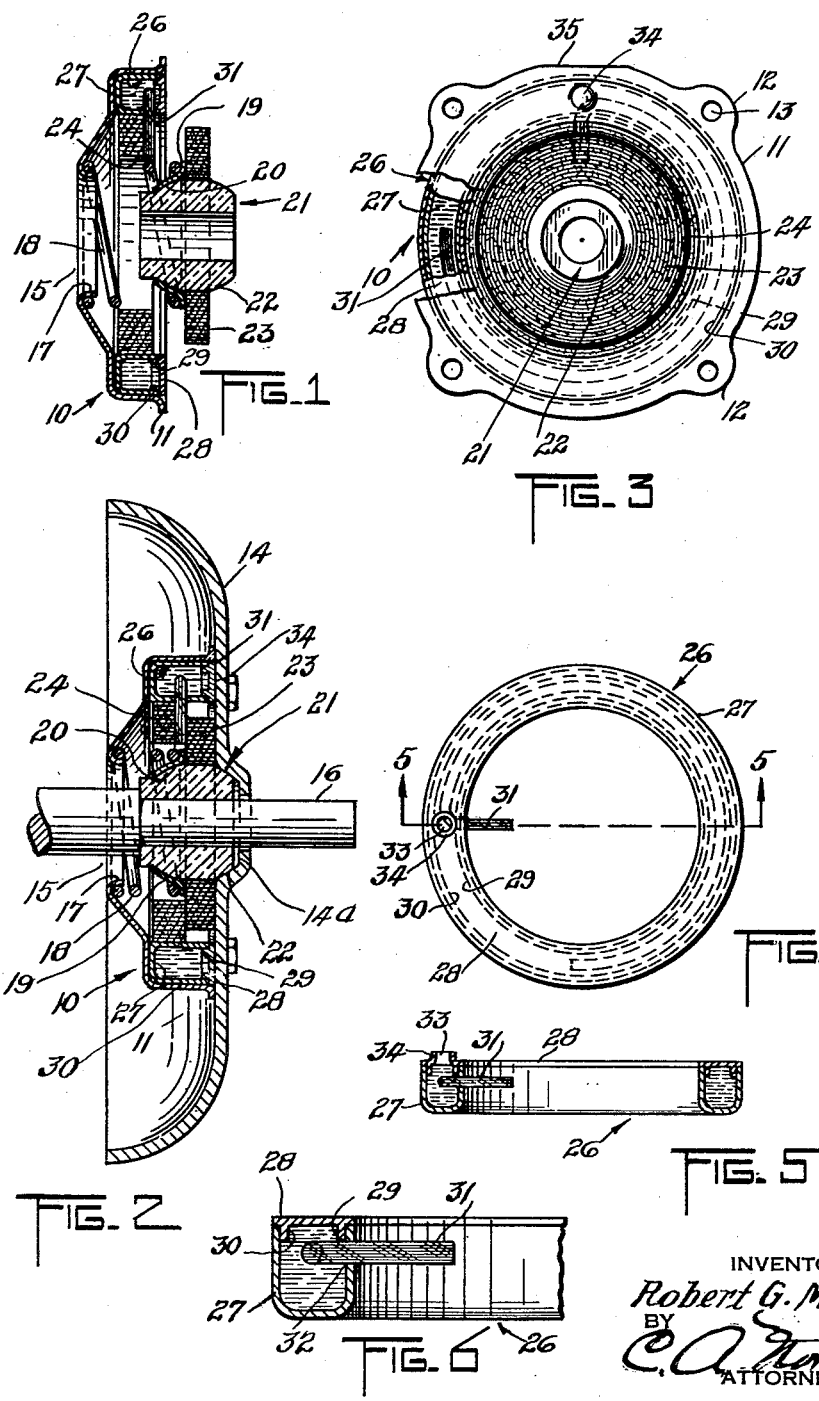
INVENTOR
Robert G. Marzolf
BY
ATTORNEY Patented Feb. 2, 1954

2,668,086

UNITED STATES PATENT OFFICE 2,668,086

LUBRICANT CONTAINER FOR BEARINGS

Robert G. Marzolf, Snyder, N. Y.

Application October 19, 1951, Serial No. 252,160

13 Claims. (Cl. 308—132)

This invention relates to bearings, and more particularly to a bearing having a lubricant container arranged to supply lubricant by capillary action to the bearing surfaces as and when needed.

I am aware that bearings of this nature have been proposed in the past but as far as I know, such bearings have never proved practical, and have never been used commercially.

It is an object of this invention to provide such a bearing which is eminently practical, inexpensive to manufacture and assemble, and embodies principles and designs which have been found to be satisfactory in extensive commercial use and in quantity production.

It is a further object of this invention to provide a lubricant reservoir and wick which may be applied to bearings of types now in commercial use, with only a few and minor changes in present designs, thereby retaining the time-tested and proved features of such designs, while greatly extending the useful life of the bearing.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a sectional view of a bearing in accordance with my invention, partly assembled, Fig. 2 is a similar view, but showing the bearing assembled to the end bell of a motor, Fig. 3 is an end elevation thereof, Fig. 4 is a top plan view of the lubricant reservoir and wick, Fig. 5 is a sectional view on lines 5—5 of Fig. 4.

Fig. 6 is a fragmentary view showing the filler hole heat-sealed closed after the container has been filled with oil.

Referring now more particularly to the drawing, 10 is the bearing housing, which, in the form shown, is generally cup-shaped and provided with annular flange 11 with projections 12 having bolt holes 13 by which the bearing housing may be secured to a casing, which may be, for example, the end bell 14 of a motor having a central opening 15 to accommodate the shaft 16.

The inner edge of shaft opening 15 is preferably slightly inturned as at 17 to provide a seat for one end of helical spring 18, the other end of which fits into bearing retainer cup 19, which is pressed by spring 18 against the left hand conical surface 20 of bearing 21, and which in turn has its right hand conical surface 22 pressed against the seat depression 14a at the center of end bell 14 when the bearing is assembled to the end bell.

The bearing shown is the type known as "self-aligning," and is made of sintered metal, with sufficient porosity to permit lubricant to seep through the metal and provide a film of oil on the shaft bearing surface.

Annular felt washers 23 and 24 are provided, and these are soaked in the lubricant before assembly, and are held in contact under slight compression when the bearing assembly is complete. As the oil on the bearing surface is consumed, more oil seeps from the felts through the sintered metal of the bearing to the load surface.

As the felts dried, it was heretofore necessary to add oil through an appropriate oil hole or holes. In spite of instructions to the user to do this at stated intervals, he may neglect or forget to do so, and the bearing runs dry and is destroyed, frequently with other damage.

In accordance with the present invention, additional oil is supplied as needed, without attention or action by the user, from annular oil-container or "doughnut" 26. This is preferably made from molded transparent or translucent plastic capable of being heat-sealed, such, for example as that known on the market as "Tenite #2," or the equivalent. The container may be molded in two pieces, the trough 27 and lid 28, the latter having annular inner and outer flanges 29 and 30 fitting snugly within the inner and outer walls of the trough 27 and sealed thereto all around, to provide an oil-tight seal. The seal may be made by heat, or by coating the flanges and the upper inner surfaces of the trough with a solvent or softener for the plastic, before the lid is put on the trough. Wick 31 is inserted in place in the container before the lid is put on, projects from the container through opening 32, and lies between and in contact with the felts 23 and 24 when the bearing is assembled.

A small hole 33 is formed in lid 28, with a lip 34 extending slightly outwardly. After assembly of the wick and container and the sealing of the lid to the trough, a quantity of lubricant is poured into the container through hole 33, and the hole sealed, preferably by the application of a hot iron to the projecting lip 34. When the bearing is assembled with the container axis horizontal, the projecting wick is ordinarily placed at the top, projecting downwardly into contact with the felts. To facilitate this, the housing 10 may have a small flat 35 on one side to serve as a marker. The wick is preferably formed of glass fiber, but other material may be employed if desired.

It will be understood that as oil is consumed, more oil seeps from the felts through the bearing to the shaft, and additional oil is drawn by capillary action from the reservoir through the wick to the felts to keep them wet. This maintains at all times a film of oil on the bearing surfaces, greatly extending the useful life of the bearing, and doing away with the necessity for periodic oiling by the user. In fact, I eliminate the oil holes and piping heretofore used.

The wick should fit the hole in the container sufficiently tight to prevent leakage of oil, which, if it occurred, would empty the container relatively quick, while still permitting oil to seep through the wick to the felts as needed. With such a fit, the container may be mounted in any position required, without danger of oil leakage.

It is within the contemplation of my invention to make the container of metal, if desired, but this would involve soldering or welding, or other special process to make the container oil-tight, and the metal container will ordinarily be more expensive than the plastic container. For this and other reasons, for most purposes I prefer the plastic container, but a metal container may be used where the conditions make it more desirable.

While I have shown and described by way of example a bearing of the "self-aligning" type, the same principles can be applied to sleeve bearings employing a bearing of sintered metal of high porosity, through which the oil seeps from the saturated felts to the shaft. It will also be understood that while I have referred by way of example to the use of my bearing in an electric motor, it is useful in many other applications where relatively low bearing pressures are employed, such as in washing machines, vacuum cleaners, small machine tools, refrigerators, air conditioners, and the like.

In the drawing, I have shown only one bearing assembly applied to the right hand end bell, looking at the front of the machine, and it will be understood that another such bearing assembly will be applied to the left hand end bell. These assemblies are the same, not pairs as in right and left gloves, and are applied facing in opposite directions, so that the left hand bearing assembly drawing is simply the mirror image of the right hand assembly drawing.

In the foregoing specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In a bearing structure, a housing adapted to be secured to a casing, a bearing element of oil pervious material mounted within said housing, a washer of fibrous, oil-absorbent material surrounding said element, and an annular lubricant container within said housing, said container having a wick extending from the interior of said container into contact with said fibrous material.

2. In a bearing structure, a support for a bearing element, a cup-like housing adapted to have its open face secured to said support, an oil-pervious bearing element within said housing and spring pressed against said support, a layer of fibrous oil-absorbent material surrounding said element, and an annular lubricant container surrounding said layer and having a wick extending from the interior of said container into contact with said fibrous material.

3. In a bearing structure, a cup-like housing adapted to be secured to a support, a bearing element of oil-pervious material mounted within said housing, a pair of fibrous washers side by side surrounding said element, at least one of said washers being in contact with said element, an annular oil container coaxial with said element and having a wick extending from the interior of said container into contact with said washers.

4. In a bearing structure, a cup-like housing adapted to be secured to a support, a bearing element of oil-pervious material mounted within said housing, a compression spring engaging said housing and said element, fibrous washers surrounding said element, at least one of said washers being in contact with said element, an annular oil container coaxial with said element, engaging the inside wall of said housing, and having a wick extending from the interior of said container into contact with said washers.

5. In a bearing structure, a housing adapted to be secured to a support, a self-aligning bearing element of oil-pervious material mounted within said housing, a spring engaging said housing and said element to urge them apart, a hollow ring-shaped container fitted against the inside periphery of said housing, a wick projecting from the interior of said container, and oil-absorbent fibrous material in contact with said wick and said element.

6. A lubricant container for bearings consisting of a hollow annulus of heat-sealing plastic having an opening for a wick, and a second opening for filling, said second opening having a lip adapted to be heat sealed after filling of said container.

7. A lubricant container for bearings consisting of a hollow ring-shaped container of substantially rectangular cross section formed of heat-sealing plastic and having an opening in one face for a wick, and having a second opening for filling, said second opening having a surrounding flange adapted to be heat sealed.

8. A lubricant container for bearings formed of a ring-shaped trough having a cover, both of plastic, said container having a wick projecting through an opening therein, said cover and said trough being sealed together with an oil-tight seal.

9. A lubricant reservoir assembly for bearings consisting of a hollow ring-shaped container having an opening therein, and a wick extending from the interior of said container and having a portion extending freely beyond said assembly therefrom, said wick fitting said opening sufficiently tight to prevent leakage from said container, while permitting lubricant to seep through said wick whereby said freely extending portion may be placed in capillary association with the lubrication supply means of a bearing upon insertion of said reservoir assembly in a bearing structure.

10. A combination comprising a self-contained lubricant reservoir assembly for bearings consisting of a hollow ring-shaped oil-tight container having an opening therein and a wick completely filling and extending through said opening into the interior of said container and projecting therefrom freely on the outside of said assembly whereby said projecting portion may be placed in capillary association with the lubrication supply means of a bearing upon insertion of said reservoir assembly in a bearing.

11. The combination set forth in claim 8, said wick completely filling said opening and having a free end positioned to be placed in capillary association with the lubrication supply of a bearing.

12. The combination set forth in claim 8, a bearing assembly having a bearing surface of sintered metal, said wick having a portion in capillary association with said sintered metal whereby to supply lubricant thereto.

13. The combination set forth in claim 9, a bearing assembly having a mounting and a bearing surface of sintered metal, said wick having said portion in capillary association with said sintered metal whereby to supply lubricant thereto, and said mounting supporting said reservoir assembly.

ROBERT G. MARZOLF.

References Cited in the file of this patent

UNITED STATES PATENTS

| Number | Name | Date |
|---|---|---|
| 535,054 | Dessau | Mar. 5, 1895 |
| 2,117,550 | Eynon | May 17, 1938 |
| 2,313,766 | Pfanstiehl | Mar. 16, 1943 |